Patented Apr. 28, 1942

2,281,194

UNITED STATES PATENT OFFICE 2,281,194

WATER TREATMENT PROCESS AND MATERIAL

Eric Leighton Holmes, Lucie Evelyn Holmes, and William George Prescott, London, England, assignors, by mesne assignments, to The Permutit Company, New York, N. Y., a corporation of Delaware No Drawing. Application December 24, 1938, Serial No. 247,640. In Great Britain December 31, 1937

5 Claims. (Cl. 210—24)

The invention relates to treatment of water; and it comprises a method of abstracting acids from water, in which water is passed in contact with extended surfaces of resins as thin layers on carrier bodies, whereby acid is removed, the operation being interrupted occasionally, the resin surfaces regenerated by a treatment with an alkaline solution, and operation resumed; all as more fully hereinafter set forth and claimed.

In conditioning water for laundry and boiler purposes, it is customary to remove the hardness giving constituents, lime and magnesia, either by base exchange or by a lime soda treatment. In either event, sodium compounds are added to the water in lieu of part or all of the lime and magnesia removed. A water thus conditioned does not produce scale in the boiler, but a high dissolved mineral salt content builds up in the boiler liquor as steam is produced. Waters treated by either process contain no free mineral acid other than $CO_2$, which would make them corrosive.

In some new methods of treating water to avoid producing a high saline content, bases, i. e., lime, magnesia and soda are removed by a similar method: exchange for hydrogen. The substances capable of effecting this result are often called hydrogen zeolites. Various preparations containing or derived from humic bodies are used for this purpose: peat, lignite, coals, etc., as well as preparations made by sulfating these bodies or treating them with dehydrating agents. Insofar as the dissolved mineral salts in the water are carbonates or bicarbonates, this method of treatment is efficient since the $CO_2$ left in the water can be easily removed; but insofar as sulfates and chlorides are present, free mineral acid may be left in the water.

It is known that synthetic resins prepared by condensing an amine or derivative (wholly or partly in the form of a salt), such as m-phenylene diamine, with an aldehyde or substance yielding an aldehyde on hydrolysis possess the property of exchanging anions in or removing acids from solution and can be regenerated by alkali when their capacity for removing acids or exchanging anions is exhausted. It has been found that such resins suffer from certain disadvantages in practice. For instance, the amount of water required to remove the excess alkali after regeneration is excessive, and it is almost impossible to remove the last traces of chloride when the resins are used to remove hydrochloric acid from solution.

It is an achieved object of this invention to provide an anion exchange or acid removal material which, first, requires less rinse water for the removal of excess alkali after regeneration, as compared with materials heretofore known, which, secondly, leaves less residual chloride in the treated water than has heretofore been possible, and which, thirdly, does not appreciably increase the alkali and chloride ion content in the treated water subsequent to an interruption of the treatment process.

According to the present invention, we prepare the resins as thin layers on carrier bodies, and we have found that then less wash water is required to remove the excess alkali and also that the amount of residual chloride ions left in the effluent during a run is of much smaller amount. We believe that this improvement arises from the resin being in a thin layer instead of in the form of particles of appreciable grain size such as are used industrially. Another disadvantage the original materials possess is that if they are allowed to stand for some time in the middle of a run and the run is then completed the first portion of the effluent then contains an increased amount both of alkali and chloride ions and this effluent must be run off to drain until it has reached the desired quality. We have found that the preparation on a carrier body results in a material which also possesses these defects in only a minor degree.

Any carrier body may be used, but it is preferred to use those with some more or less porous structure; such as ground coke, charcoal, activated carbon, porous siliceous bodies such as natural or synthetic zeolites, baked clay, pumice stone and the like.

In preparing the resins the carrier bodies may be impregnated with one reagent so that a film is formed and then they may be treated with a second reagent. It is preferred to impregnate the carrier bodies with the amine or its derivative, dry the bodies to form a film and then treat them with an aldehyde in liquid or gaseous form. It is desirable that a trace of moisture should be present if the condensation is to proceed readily. The impregnation preferably takes place under vacuum, and the drying need only proceed to such an extent that the final condensation product does not glue the bodies together.

As one example of a method of preparation 100 grams of pumice stone ground to a mesh size passing through a 20 mesh per inch screen and retained on a 30 mesh screen is treated with a hot solution of 20 grams m-phenylene diamine hydrochloride in 10 cc. of water, the treatmen being carried out in vacuum, as impregnation of the carrier body is improved and the film of the hydrochloride of the base cannot react with oxygen. The material is dried and then thoroughly mixed with 13 grams of paraformaldehyde and heated to cause reaction to take place. This heating can be conveniently carried out in an autoclave under a steam pressure of about 10–20 lbs. but this is not essential. About 30 minutes is sufficient to complete the reaction and the resulting material is washed free from colored impurities and is ready for use after being treated with an alkaline solution. The average thickness of the layers of resin produced in this way is about 0.5 mm.

As another example of a method of preparation, 2.1 kilograms of m-phenylene diamine hydrochloride are dissolved in 900 cc. of boiling water and stirred into 7 kilograms of ground coke of 20 to 40 mesh size. When this has been dried, it is intimately mixed with 1.2 kilograms of paraformaldehyde and heated at about 100° C. until reaction is complete.

Aqueous solutions of formaldehyde must be used with extreme care as they tend to dissolve out some of the hydrochloride of the base before reaction is complete and the whole mass sets hard.

The formaldehyde may also be used in gaseous form, and the gas may be passed through a stirred mass of impregnated carrier or caused to flow in counter-current to such a mass. The reaction with a gas may take place either at the ordinary temperature or at elevated temperatures. The reaction takes much longer, of course, at the ordinary temperature.

In an example of a specific embodiment of this invention a container, 16 mm. diameter and 125 mm. long, was charged with a 142 ml. bed of the resin impregnated coke prepared according to the above mentioned example. The water to be de-acidified contained equal amounts of dilute hydrochloric and sulfuric acids, 0.004 normal. Some 2.5–3.0 liters of this acid water passed through the bed before its acid removal capacity was exhausted. During most of the run the effluent contained about 2 p. p. m. or less chlorides, a smaller amount of sulfates ($SO_3$) and a few parts per million sodium bicarbonate alkalinity. At the end of this run the effluent contained a few parts per million hydrochloric acid and very little sulfates, i. e., sulfuric acid. The acid removal capacity of the bed was restored by treating it with 22 ml. of normal sodium carbonate solution and then rinsing out the excess sodium carbonate with the acid water, using 750 ml. to reach a point when the effluent contained about 2 parts per million chloride (Cl), 2 parts per million sulfate ($SO_3$) and 6 parts per million sodium bicarbonate, expressed as $CaCO_3$. This volume of rinse water is approximately a third of that required for rinsing a similar bed of a synthetic resin. And the dissolved solids content of the effluent at the end of this short rinse on the resin impregnated material was about half of that obtained when rinsing the resin product with triple the volume of rinse water used on the resin impregnated coke.

The invention is especially useful in conjunction with base removal with aid of hydrogen zeolites of the carbonaceous type, humic or sulfated humic materials. Raw hard water may be passed through a bed of hydrogen zeolite to remove cations such as sodium, calcium, magnesium, etc., and the effluent passed through a bed of a resin impregnated carrier according to this invention for the removal of acids; the two beds being regenerated from time to time respectively with acid and with an alkali.

Modifications of the invention as disclosed herein may be made without departing from the spirit of our invention, and reference is, therefore, made to the appended claims for a definition of the scope of our invention.

What we claim is:

1. A process for de-acidifying water, comprising passing a water containing free acid in contact with extensive surfaces of a resin impregnated carrier made by treating an inert material first with a solution of an organic amine and then at an elevated temperature with an aldehyde capable of forming at such temperature an insoluble acid absorbing condensation product with said amine, and regenerating the resin impregnated carrier from time to time by washing with dilute alkaline solutions.

2. In the purification of water containing dissolved mineral salts, a two-stage process which comprises first passing the water in contact with a carbonaceous hydrogen zeolite material removing cations therefrom and afterwards passing the water in contact with a resin impregnated carrier made by treating an inert material first with a solution of an organic amine and then at an elevated temperature with an aldehyde capable of forming at such temperature an insoluble acid absorbing condensation product with said amine, the hydrogen zeolite and the resin impregnated carrier being regenerated from time to time by treatment with acid and alkali respectively.

3. An anion exchange material made by treating an inert carrier material first with a solution of an organic amine and then at an elevated temperature with an aldehyde capable of forming at such temperature an insoluble acid absorbing condensation material with said amine.

4. The product of claim 3 wherein the inert carrier material is coke.

5. The product of claim 3 wherein the inert carrier material is a siliceous material.

ERIC LEIGHTON HOLMES.
LUCIE EVELYN HOLMES.
WILLIAM GEORGE PRESCOTT.